May 19, 1942.   W. G. EDELL   2,283,322
WEED CUTTER
Filed Oct. 15, 1940
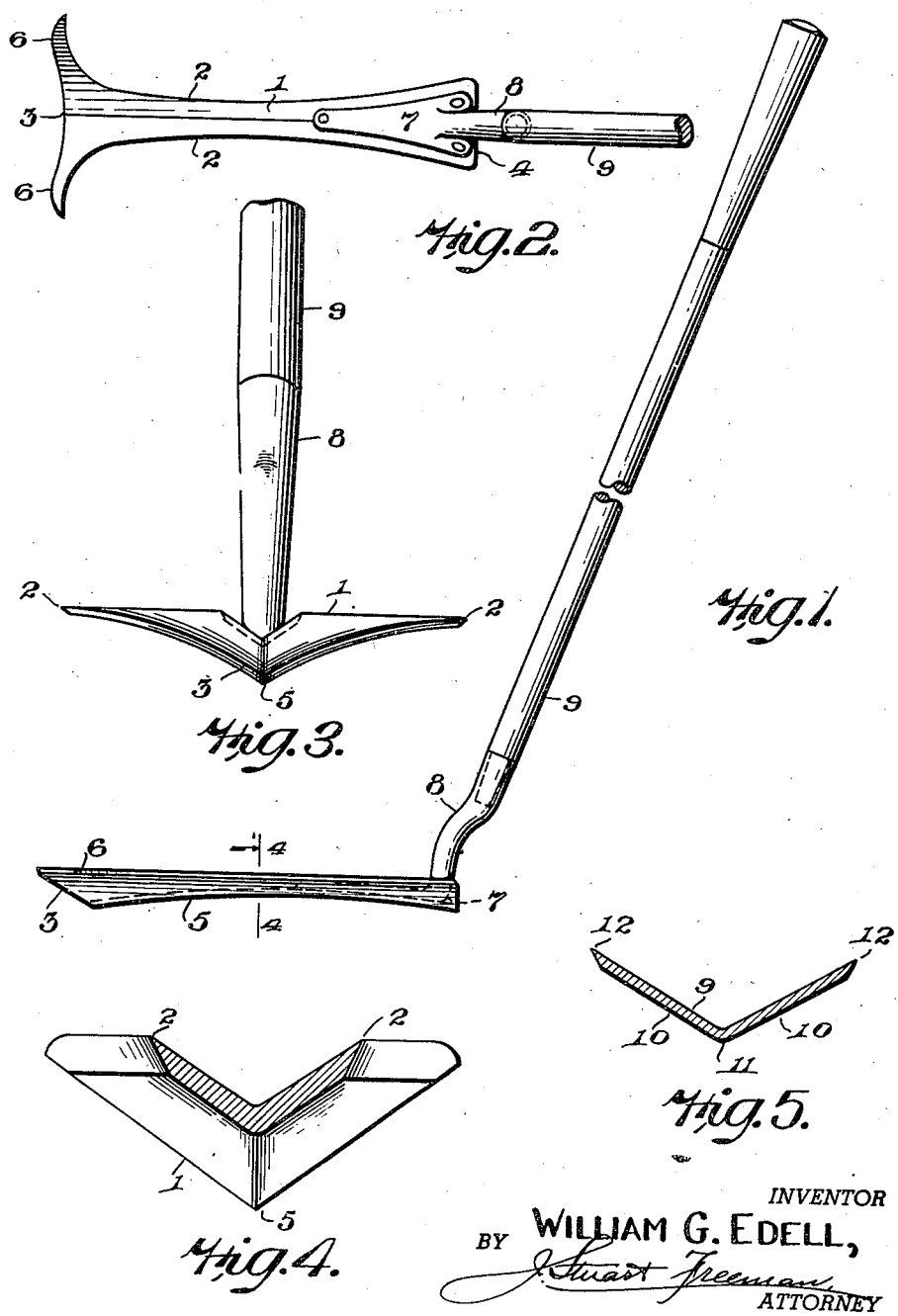
INVENTOR
BY WILLIAM G. EDELL,
ATTORNEY Patented May 19, 1942

2,283,322

UNITED STATES PATENT OFFICE 2,283,322

WEED CUTTER

William G. Edell, Upper Darby, Pa.

Application October 15, 1940, Serial No. 361,243

3 Claims. (Cl. 30—318)

The object of the invention broadly is to provide improvements in cutting implements, and particularly in that class which is intended for use in cutting weeds and the like.

Another object is to provide a tool of this type, which is double-edged in order that it can be moved laterally and alternately to and fro, thereby accelerating the weed cutting operation, and at the same time providing such tool with either a short handle for cutting in a manner similar to that employed with a sickle, or with a long handle with which the tool may be swung pendulum-like in a manner similar to that employed in sweeping with a broom.

A further object is to provide in a tool of this type a pair of oppositely directed cutting edges, which may be either straight or slighly curved, but in any case preferably terminating outwardly in a sickle-like or substantially hooked end portions.

Still another object is to provide in such a tool a blade, which is preferably though not necessarily provided with a central, depending, longitudinally extending, angular portion, which serves the double purpose of longitudinally stiffening the said blade, and at the same time providing a fender-like portion, operative to maintain the cutting edges in spaced relation with the ground, and thus guard said edges against contact with stones, gravel, or other relatively unyielding objects resting upon or protruding from the ground and liable to dull one or both of said edges upon coming into contact abruptly therewith.

And a still further object is to provide in such a tool a pair of cutting edges which lie in a common plane, while the depth of the stiffening angular portion or corrugation varies so as to be longitudinally arcuate, or in other words varying in depth between its opposite end portions and its center.

With the objects thus briefly stated, the invention comprises further details of construction and operation, which are hereinafter fully brought out in the accompanying drawing, in which Fig. 1 is a side elevation of a tool comprising one embodiment of the invention; Fig. 2 is a plan view of the lower end portion of the same; Fig. 3 is a front elevational view of that portion of the tool shown in Fig. 2; Fig. 4 is a vertical sectional view on the line 4—4 of Fig. 1; and Fig. 5 is a vertical section of a slightly modified form or shape of blade for such tool.

Referring to Figs. 1, 2, 3 and 4 of the drawing, one embodiment of the invention comprises a blade having a body portion 1, characterized by a pair of oppositely directed cutting edges 2, which may be straight or substantially so, but which are preferably slightly curved in a concave manner, thereby providing transversely wider portions of the blade adjacent to its forward and rear ends 3 and 4.

This blade may comprise a flat or planular metallic member, but in that case it would have to be of relatively heavier material in order to insure its desired rigidity. Consequently, from the standpoint of economy it is preferred to use sheet metal, wherefore in order to maintain the desired degree of rigidity said blade is either provided with one or more longitudinally extending corrugations, or is of suitable angular cross section, the latter being preferred as it provides a centrally disposed, depending guard or fender for the protection of the cutting edges, which are thereby kept in spaced relation with the ground, as above referred to.

Accordingly, the preferred form of the blade is centrally depressed angularly, as shown in Figs. 3 and 4, providing a depending guard ridge 5, the opposite sides of said blade being preferably curved so as to present concave surfaces downwardly, thereby tending to cause the under side of said blade to ride over obstructions that might injure or at least dull the cutting edges. Said angular guard ridge is preferably curved longitudinally in an arcuate form, as indicated in Fig. 1, with the result that said blade is of greater depth adjacent to its heel and its toe, or opposite end, portions. In fact, if the metal is sufficiently light, and depends upon said angularity for its normal stiffness, this variation in the depth of the blade will permit it to flatten out centrally, and thereby flex at that locality, while its heel and toe portions remain relatively rigid and unyielding, as for instance when the toe of said blade is pressed abnormally against the ground, as the operator may rest upon it.

In addition to the foregoing characteristics, the forward end portion of the blade is preferably provided with oppositely extending, tapering, hooked portions 6, the edges of which are sharpened and comprise curved continuations of said first-mentioned cutting edges. Thus, in the operation of the tool, as it is swung laterally to and fro, weeds and the like which are not immediately cut upon contact with a rearward portion of one or the other of said edges, will be cut by the curved edges of said hooked extensions, since such weeds and the like are unable to slide therefrom without first being severed.

To the rear end portion of said blade member, whether it is planular or of angular cross section, there is firmly secured the widened foot portion 7 of a socket 8 into which is in turn secured the adjacent end of a handle, which as hereinbefore pointed out may be either short or long and up-standing, as may be desired, said handle being of any shape, size and material, as its presence does not enter into the invention, except in a broad way in association with the form and construction of said blade.

Referring to Fig. 5, there is here represented the sheet metal form of blade, shown as comprising a member 9 having an angular cross section, in turn comprising a pair of angularly disposed nether surfaces 10, which may be either flat or curved, and which are joined together at the depending, central, angular guard portion 11, while the laterally oppositely directed edges 12, like those of the form of tool hereinbefore described at length, are sharpened in any shape that may be desired.

Having thus described my invention, what I claim and desire to protect by Letters Patent of the United States is:

1. The combination of a substantially upright handle, with a cutting tool adapted to be moved laterally to and fro, said tool comprising a metallic member of shallow V-shaped cross section, provided with oppositely directed cutting edges, the depth of said V-shape being greater at the rear to receive the handle connection beneath the level of said cutting edges, and also deeper at its forward portion to provide a protective ground-engageable toe, and the sides of the V-shape cross section being outwardly concaved.

2. A cutting tool adapted to be moved to and fro, comprising a metallic member of angular cross section and longitudinally arched about a transverse axis, to provide depending heel and toe portions, said member being also provided with oppositely directed cutting edges lying in a common plane.

3. A cutting tool adapted to be moved to and fro, comprising a metallic member of shallow angular cross section and longitudinally arched about a transverse axis, to provide depending protective heel and toe portions, said member being provided with oppositely directed cutting edges, which terminate forwardly in oppositely directed hooked extensions and lie in a common plane.

WILLIAM G. EDELL.